United States Patent
Saltz

(10) Patent No.: US 7,543,331 B2
(45) Date of Patent: *Jun. 2, 2009

(54) FRAMEWORK FOR PROVIDING A CONFIGURABLE FIREWALL FOR COMPUTING SYSTEMS

(75) Inventor: Michael K. Saltz, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 663 days.

This patent is subject to a terminal disclaimer.

(21) Appl. No.: 10/743,929

(22) Filed: Dec. 22, 2003

(65) Prior Publication Data

US 2005/0149926 A1  Jul. 7, 2005

(51) Int. Cl.
G06F 9/00 (2006.01)

(52) U.S. Cl. .................. 726/11; 726/4; 726/9; 713/153

(58) Field of Classification Search .................. None
See application file for complete search history.

(56) References Cited

U.S. PATENT DOCUMENTS

| | | | |
|---|---|---|---|
| 5,751,813 A | 5/1998 | Dorenbos | |
| 6,092,191 A | 7/2000 | Shimbo et al. | |
| 6,092,202 A | 7/2000 | Veil et al. | |
| 6,256,690 B1 | 7/2001 | Carper | |
| 6,317,838 B1 | 11/2001 | Baize | |
| 6,353,886 B1 | 3/2002 | Howard et al. | |
| 6,470,447 B1 | 10/2002 | Lambert et al. | |
| 6,526,506 B1 | 2/2003 | Lewis | |
| 6,542,993 B1 | 4/2003 | Erfani | |
| 6,553,492 B1 | 4/2003 | Hosoe | |
| 6,678,822 B1 | 1/2004 | Morar et al. | |
| 7,127,605 B1 * | 10/2006 | Montgomery et al. | 713/150 |
| 7,380,008 B2 * | 5/2008 | Teng et al. | 709/227 |
| 2001/0007146 A1 | 7/2001 | Hansmann et al. | |
| 2003/0189092 A1 | 10/2003 | Takano | |
| 2004/0154027 A1 * | 8/2004 | Vandewalle et al. | 719/330 |

OTHER PUBLICATIONS

Sun Microsystems, Inc., "Java Card™ 2.2 Runtime Environment (JCRE) Specification", Jun. 2002, © 2002 Sun Microsystems, Inc., pp. iii-110.
PCT International Search Report, Apr. 27, 2005.
PCT Written Opinion of the International Searching Authority, Apr. 27, 2005.
"Letter and Second Opinion," by Trakker Technologies, Inc. Jul. 5, 2005.

* cited by examiner

Primary Examiner—Pramila Parthasarathy
(74) Attorney, Agent, or Firm—Sonnenchein Nath & Rosenthal LLP

(57) ABSTRACT

A configurable firewall for computing systems is disclosed. The configurable firewall provides a firewall control block that can be used as a mechanism to implement and control access privileges between various components of the computing environment. As such, the firewall control block can be used to determine whether one component (e.g., applet) can access another component in the computing environment. This allows a flexible environment where firewall boundaries can be configured in such a way that each applet can allow access to a desired set of other applets. In addition, the control block can be implemented using a variety of techniques that may be suitable for different system requirements (e.g., processing speed, memory). As such, the configurable firewall is useful for implementing security for various computing systems, especially those that operate with relatively limited processing power and/or provide highly specialized functionality (e.g., smart cards).

11 Claims, 6 Drawing Sheets

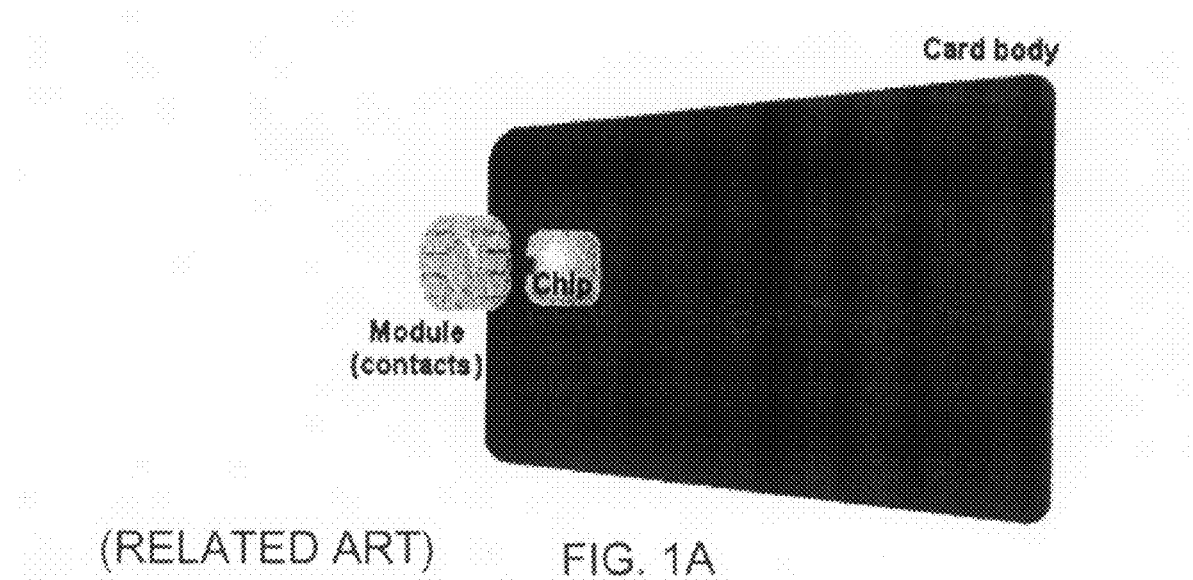
(RELATED ART) FIG. 1A
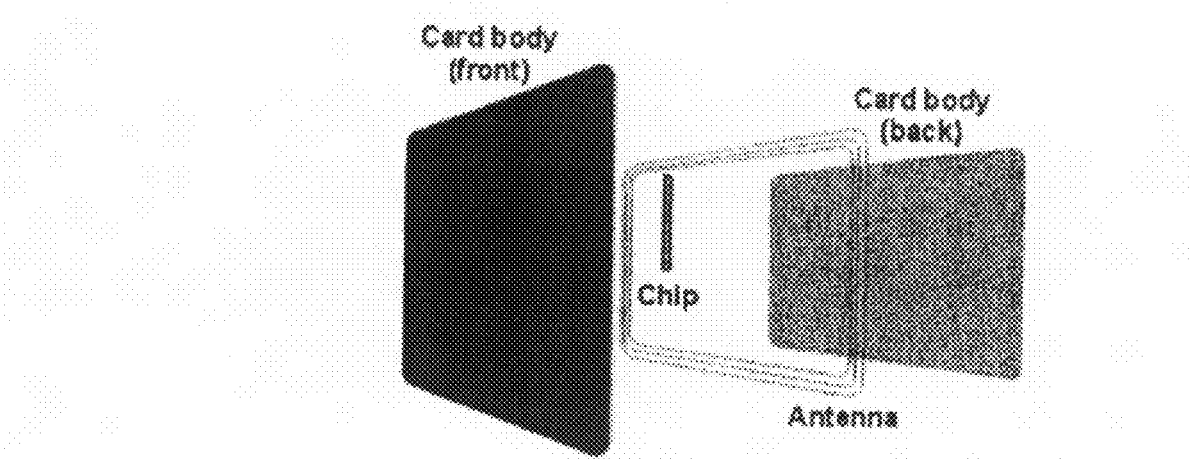
(RELATED ART) FIG. 1B

FRAMEWORK FOR PROVIDING A CONFIGURABLE FIREWALL FOR COMPUTING SYSTEMS

BACKGROUND OF THE INVENTION

The present invention relates generally to computing systems, and more particularly, to techniques for providing secure computing systems.

Unlike the typical desktop, other computing devices are mobile, highly specialized for a particular application, operate with relatively less memory, and/or processing constraints. By way of an example, a smart card is representative of a mobile computing device that can be highly specialized for a particular application (e.g., security). Smart cards are also an example of a computing environment where the amount of memory and processing power that can be provided is typically not as much as those in the desktop (e.g., Personal Computer) environments. As such, a smart card may provide a good example and will be discussed.

Smart cards were introduced about two decades ago in the form of memory cards that were used to store critical information (e.g., phone cards). The smart cards today are, however, much more sophisticated than those initially introduced. Today, a smart card can have an embedded integrated circuit (IC). The smart card can, for example, be a plastic card that includes the embedded integrated circuit (IC). The smart card can resemble a credit card. Moreover, it can be used to highly sensitive applications (e.g., banking, security). As a result, extensive efforts have been made by a number of entities to develop smart cards that are secure Smart-card technology is an industry standard defined and controlled by the Joint Technical Committee 1 (JTC1) of the International Standards Organization (ISO) and the International Electronic Committee (IEC). The series of international standards ISO/IEC 7816, introduced in 1987 with its latest update in 2003, defines various aspects of a smart card, including physical characteristics, physical contacts, electronic signals and transmission protocols, commands, security architecture, application identifiers, and common data elements.

In some areas of use, smart cards are just memory cards that merely provide protected non-volatile storage. More advanced smart cards, however, have both microprocessors and memory, and can be used for secure processing and storage. Smart cards can operate without a battery (i.e. become active only when connected with a card reader). When connected, after performing a reset sequence the card remains passive, waiting to receive a command request from a client (host) application. Smart cards can be contact or contactless. As the names imply, contact smart cards work by communicating via physical contact between a card reader and the smart card's 8-pin contact, while contactless smart cards communicate by means of a radio frequency signal, with a typical range of less than 2 feet. The radio communication of contactless smart cards is based on technology similar to Radio Frequency ID (RFID) tags used in stores to counter theft and track inventory. FIG. 1 depicts contact and contactless smart cards. FIGS. 1A and 1B respectively depict contact and contactless smart cards.

Given the popularity of mobile devices today, it is desirable to develop programming environments that are better suited for them. These programming environments, among other things, should be secure.

SUMMARY OF THE INVENTION

As noted above, given the popularity of mobile devices, it is desirable to develop programming environments that are better suited for them. These programming environments typically operate with relatively limited resources (processing power and/or memory) and/or provide highly specialized functionality.

As a platform independent programming environment, Java™ technology, among other things, is well suited for such environments. Java™ is a programming language that is well suited for use in the distributed environment (e.g., Internet). It was designed to have the "look and feel" of the C++ language, but it is simpler to use than C++ and enforces an object-oriented programming model. Java™ can be used to create complete applications that may run on a single computer or be distributed among servers and clients in a network. It can also be used to build a small application module or applet for use as part of a Web page. Applets make it possible for a Web page user to interact with the page.

Java™ platform includes the Java Card™ technology. The Java Card™ technology adapts the Java™ programming platform for use on smart cards and other mobile devices whose environments are highly specialized and/or operate under more severe memory and/or processing constraints relative to, for example, desktop computing environment. Java Smart Cards™ are useful in many different areas. They can be used to add authentication and secure access to information systems that require a high level of security. Information stored in Java Smart Cards™ are portable. With Java Card™ technology, valuable and sensitive personal information such as medical history, credit card numbers, or electronic cash balances can be carried in a medium that is compact, yet secure.

Java Card™ technology also exists in form other than smart cards, such as smart buttons and USB tokens (illustrated in FIGS. 1C and 1D). Similar to a smart card, the smart button and USB token can be used to authenticate users or carry sensitive information, for example. Smart buttons can include a battery and are typically contact-based, while USB tokens can be plugged directly into the USB port of a PC with no need for a contact or contactless reader. In any case, these other forms can provide the same programming capabilities as smart cards and have tamper-resistance properties.

In addition to the protections provided by the Java™ programming environment, the Java™ card technology provides an application (or applet) firewall as an added runtime-enforcement protection. The firewall essentially partitions the Java™ card platform into separate protected object spaces (or "contexts"). In other words, the firewall provides a boundary between one context and another context. In this environment, separate protected spaces (or context) may not be able to access each other.

It should be noted that applets are typically packaged together in what can be referred to a Java™ package. It should also be noted that all applets within a single Java™ package share the same context. This means that there is no firewall between the applets within the same package. Moreover, the firewall boundaries are dependent on how the applet are packaged. This means that it may not be possible to define firewall boundaries based on individual applets. This firewall implementation can be referred to as a package-based firewall environment.

In a package-based firewall environment, allowing applets that are not in the same package to access each other requires relatively complex techniques. By way of example, a shareable interface has to be implemented for an applet that can be accessed by other applets (e.g., JCSystem.getAppletShareableInterfaceObject( ) method). Accordingly, a first applet can request access to a second applet's sharable interface. Then, on behalf of the first applet, the Java™ Card Runtime Environment (JCRE) can ask the second applet for its shareable interface by invoking a method (e.g., getSharableInterfaceObject( ) method). If access is allowed by the second applet, then the first applet has to obtain a reference to the second applet.

In view of the foregoing, alternative techniques for providing a secure computing environment would be useful. To achieve these and other objectives of the invention, frameworks for providing a configurable firewall are disclosed. The configurable firewall provides a control block that can be used as a mechanism to implement and control access privileges between various components of the computing environment. As such, the firewall control block can be used to determine whether one component can access another component in the computing environment.

By way of example, a control block can be provided for each Java™ application (or applet) in a Java™ card computing environment in accordance with one embodiment of the invention. This allows a flexible environment where firewall boundaries can be selectively configured and defined for each individual applet. This provides a flexible environment where firewall boundaries can be defined in such a way that each applet can allow access to a desired set of applets and vice a versa.

In addition, it will be illustrated that the firewall control block can be implemented using variety of techniques that may be suitable for different system requirements (e.g., processing speed, memory). As such, the configurable firewall is useful for implementing security for various computing systems, especially those that operate with relatively limited processing power and/or provide highly specialized functionality (e.g., smart cards). As will also be illustrated, numerous forms of the firewall control block can use a variety of techniques to implement security. Other aspects of the invention provide the techniques that can be used to implement security using various firewall control blocks.

The invention can be implemented in numerous ways, including a system, an apparatus, a method or a computer readable medium. Several embodiments of the invention are discussed below.

As a computing environment, one embodiment of the invention includes an operating system, a virtual machine operating on the operating system, first and second applications operating on the virtual machine. In addition, a firewall control block is provided in the computing environment.

The firewall control block defines access privileges of the first application with respect to the second application, and further defines the access privileges of the second application with respect to said first application. This firewall control block can, for example, be implemented for a mobile device. By way of example, a Java™ smart card can be implemented using a firewall control block in accordance with one embodiment of the invention.

Yet another embodiment can be implemented as a method of providing security for a Java™ compliant computing environment. The Java™ compliant computing environment includes a Java™ virtual machine and a plurality of Java™ compliant applets that operate on the Java™ virtual machine. Initially, a request from a first Java™ compliant applet is received. This request is a request to access a second Java™ compliant applet. Next, a firewall control block associated with the second Java™ compliant applet is read. Thereafter, it is determined, based on said firewall control block, whether the first Java™ compliant applet should be allowed to access said second Java™ compliant applet. As will be discussed below, this determination can be based on a variety of different criteria. Accordingly, the first Java™ compliant applet is granted access only when it is determined that access should be allowed. Similarly, a computer readable media including computer program code can be implemented.

BRIEF DESCRIPTION OF THE DRAWINGS

The present invention will be readily understood by the following detailed description in conjunction with the accompanying drawings, wherein like reference numerals designate like structural elements, and in which:

FIGS. 1A, 1B, 1C and 1D depict a mobile computing device.

DETAILED DESCRIPTION OF THE INVENTION

Figure 1C:
Figure 1D:
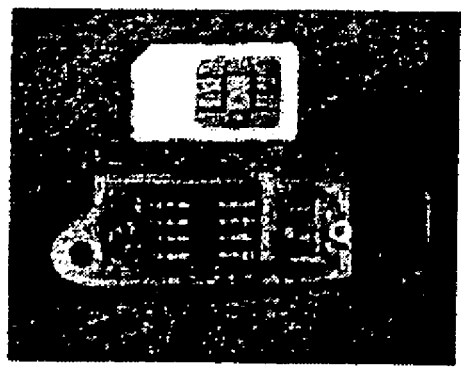

As described in the background section, given the popularity of mobile devices, it is desirable to develop programming environments that are better suited for them. These programming environments typically operate with relatively limited resources (processing power and/or memory) and/or provide highly specialized functionality.

As a platform independent programming environment, Java™ technology, among other things, is well suited for such environments. Java™ is a programming language that is well suited for use in the distributed environment (e.g., Internet). It was designed to have the "look and feel" of the C++ language, but it is simpler to use than C++ and enforces an object-oriented programming model. Java™ can be used to create complete applications that may run on a single computer or be distributed among servers and clients in a network. It can also be used to build a small application module or applet for use as part of a Web page. Applets make it possible for a Web page user to interact with the page.

Java™ platform includes the Java Card™ technology. The Java Card™ technology adapts the Java™ programming platform for use on smart cards and other mobile devices whose environments are highly specialized and/or operate under more severe memory and/or processing constraints relative to, for example, desktop computing environments. Java Smart Cards™ are useful in many different areas. They can be used to add authentication and secure access to information systems that require a high level of security. Information stored in Java Smart Cards™ is portable. With Java Card™ technology valuable and sensitive personal information such as medical history, credit card numbers, or electronic cash balances can be carried in a medium that is compact, yet secure.

Java Card™ technology also exists in form factors other than smart cards, such as smart buttons and USB tokens (illustrated in FIGS. 2A and B). These can be used much as smart cards are, to authenticate users or carry sensitive information, for example. Smart buttons include a battery and are contact-based, while USB tokens can be plugged directly into the USB port of a PC with no need for a contact or contactless reader. Both provide the same programming capabilities as smart cards and have tamper-resistance properties.

In addition to the protections provided by the Java™ programming environment, the Java Card™ technology provides an application (or applet) firewall as an added runtime-enforcement protection. The firewall essentially partitions the Java Card™ platform into separate protected object spaces (or "contexts"). In other words, the firewall provides a boundary between one context and another context. In this environment, separate protected spaces (or context) may not be able to access each other.

It should be noted that applets are typically packaged together in what can be referred to as a Java™ package. It should also be noted that all applets within a single Java™ package share the same context. This means that there is no firewall between the applets within the same package. Moreover, firewall boundaries are dependent on how the applets are packaged. This means that it may not be possible to define firewall boundaries per applet bases. This firewall implementation can be referred to as a package-based firewall environment.

In a package-based firewall environment, allowing applets that are not in the same package to access each other requires relatively complex techniques. By way of example, a shareable interface has to be implemented for an applet that can be accessed by other applets (e.g., JCSystem.getAppletShareableInterfaceObject( ) method). Accordingly, a first applet can request access to a second applet's sharable interface. Then, on behalf of the first applet, the Java Card Runtime Environment (JCRE) can ask the second applet for its shareable interface by invoking a method (e.g., getSharableInterfaceObject( ) method). If access is allowed by the second applet, then the first applet has to obtain a reference to the second applet.

In view of the foregoing, alternative techniques for providing a secure computing environment would be useful. To achieve these and other objectives of the invention, frameworks for providing a configurable firewall are disclosed. The configurable firewall provides a firewall control block as a mechanism to implement and control access privileges between various components of the computing environment. As such, the firewall control block can be used to determine whether one component can access another component in the computing environment based on the access privileges defined in the firewall control block.

By way of example, a control block can be provided for each Java™ application (or applet) in a Java Card™ computing environment in accordance with one embodiment of the invention. This allows firewall boundaries to be configured around each applet in such a way that each applet can allow access to a desired set of applets. In addition, as it will be illustrated, the firewall control block can be implemented using a variety of techniques that may be suitable for different system requirements (e.g., processing speed, memory). As such, the configurable firewall is useful for implementing security for various computing systems, especially those that operate with relatively limited processing power and/or provide highly specialized functionality (e.g., smart cards). As will also be illustrated, numerous forms of the firewall control block can be used in conjunction or combination with each other to implement security. Other aspects of the invention provide the techniques that can be used to implement security using various firewall control blocks.

Embodiments of the invention are discussed below with reference to FIGS. 1-5. However, those skilled in the art will readily appreciate that the detailed description given herein with respect to these figures is for explanatory purposes only as the invention extends beyond these limited embodiments.

Figure 2:
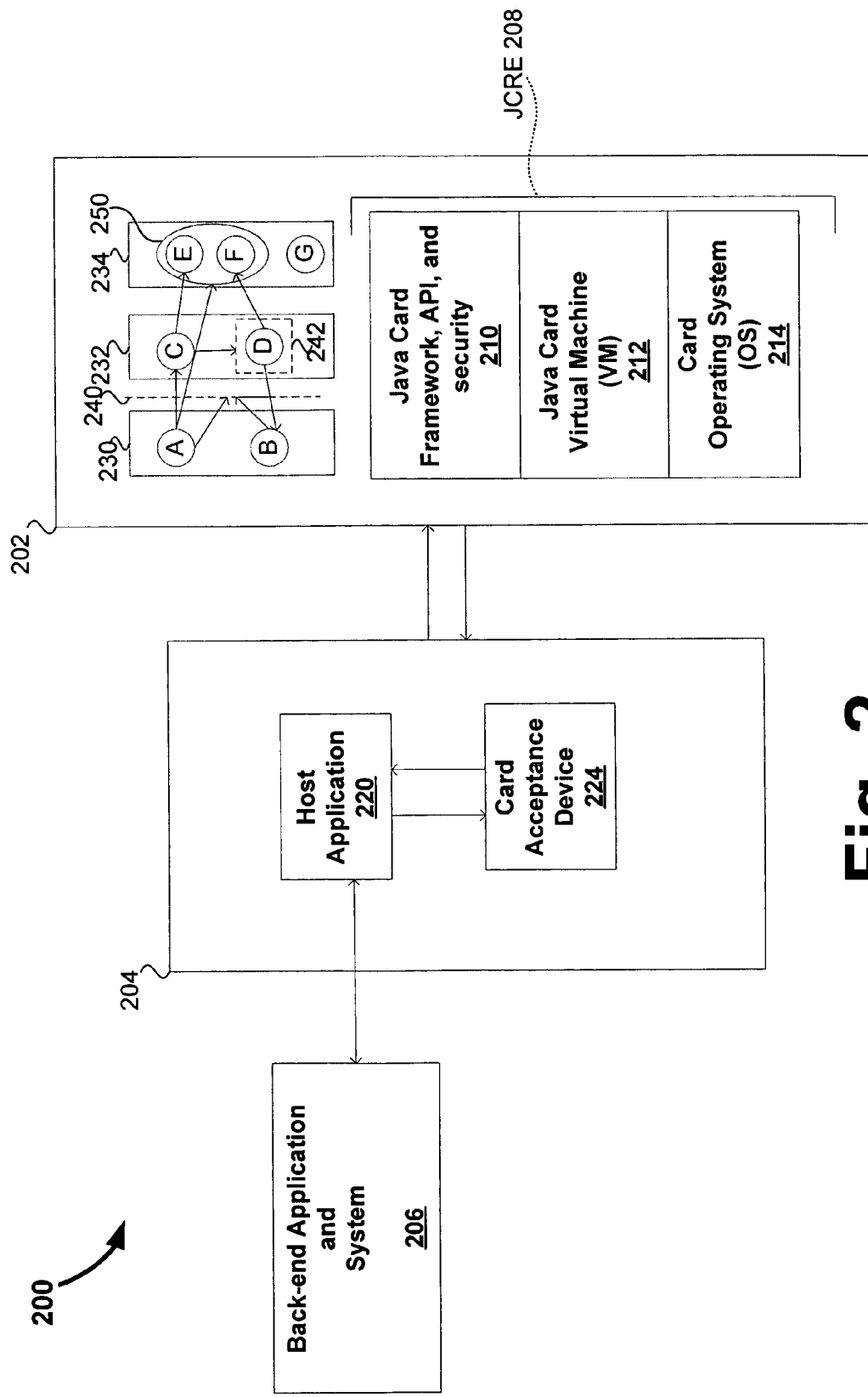
FIG. 2 illustrates an exemplarily computing environment in accordance with one embodiment of the invention.

FIG. 2 illustrates an exemplarily computing environment 200 in accordance with one embodiment of the invention. The computing environment 200 includes a card-side 202, a reader-side 204, and back-end application and system 206.

In the described embodiment, the card-side 202 is implemented as a Java Card™ platform 202 that provides a multiple-application environment. As FIG. 2 illustrates, a plurality of Java Card™ applications (or applets) A, B, C, D, E, F and G may reside on the Java Card™ platform 202 (or Java Card™). These Java Card™ applications (or applets) are supported by a Java Card Runtime Environment (JCRE) 208. The Java Card Runtime Environment (JCRE) 208 includes Java Card™ framework, Application Programming Interface (API), and security 210. The Java Runtime Environment (JCRE) 208 operates on a Java™ virtual machine 212 that is supported by a card Operating System (OS) 214. The Java Card™ applets A, B, C, D, E, F, G and H can be instantiated when loaded and stay alive when the power is switched off. As such, a card applet can behave in a similar way as a server and remain passive. In other words, after the card platform 202 is powered up, an applet can remain inactive until it's selected, at which time initialization may be done.

The reader-side 204 includes a host application 220 and a Card Acceptance Device (CAD) 224. The host application 220 can, for example, reside on a desktop or a terminal such as a PC, an electronic payment terminal, a cell phone, or a security subsystem. In any case, the host application 220 can facilitate communication between the back-end application and system 206 and the Java Card™ applets A, B, C, D, E, F and G. The Card Acceptance Device (CAD) 224 can, for example, be an interface device that sits between the host application 220 and the Java Card™ platform 202. In addition, the Card Acceptance Device (CAD) 224 can provide power to the card and/or facilitate electrical or (Radio Frequency) RF communication with the card side 202. The CAD 224 can, for example, be a card reader attached to a desktop computer using a serial port, or it may be integrated into a terminal such as an electronic payment terminal at a restaurant or a gas station. It should also be noted that the CAD 224 can, for example, forward Application Protocol Data Unit (APDU) commands from the host application 220 to the Java Card™ platform 202. The Application Protocol Data Unit (APDU) can also be used to forward responses from the Java Card™ platform 202 to the host application 220.

Accordingly, the reader side 204 allows a user of the Java Card™ platform 202 to access the services provided by the host application 220 and/or the back-end application and system 206. The back-end application and system 206 provides services that support the Java™ applets A, B, C, D, E, F, and G. For example, the back-end application 206 may provide connectivity to an electronic payment system. As such, the back-end application and system 206 can, for example, provide access to credit card and/or other payment information.

As will be appreciated, the Java Card Runtime Environment (JCRE 208) can provide a firewall protection for the Java™ applets A, B, C, D, E, F and G. Moreover, the firewall protection provided by the Runtime Environment (JCRE 208) is configurable. This means that, among other things, the firewall protection does not have to be defined based on package boundaries that contain one or more Java™ applet. In other words, firewall protection does not have to be defined based on the packages 230, 232, and 324. The firewall protection can be configured using a firewall control block that is further illustrated (see for example FIG. 3), but first the configurable firewall will be further illustrated.

As illustrated in FIG. 2, package 230 contains Java™ applets A and B. Similarly, package 232 contains Java™ applets C and D. Package 234 contains Java™ applets E, F and G. The firewall boundaries, however, can be defined for each Java™ applets independently. In other words, for each one of the Java™ applets A, B, C, D, E, F and G a fire wall boundary can be defined that is not dependent on the package that contains the Java™ applet. By way of example, Java™ applet A of package 230 can be granted access through a firewall boundary portion 240 to the Java™ applet C in the package 232. The firewall portion 240, however, may deny access to the Java™ applet B of package 230 when it tries to access Java™ applet C in the package 232.

To further illustrate, FIG. 2 also depicts a firewall boundary portion 242 around the Java™ applet D. The firewall boundary portion 242 can, for example, deny access to all other Java™ applets including Java™ applet C that is contained within the same package 232. It should be noted that Java™ applet D, however, may be able to access other applets (e.g., Java™ applet B). It should also be noted that the firewall can be used to implement a library that can be accessed by one or more selected Java™ applets and/or packages regardless of package boundaries. By way of example, Java™ applets E and F can be implemented as a library 250. The library 250 can be accessed by any of the Java™ applets A, B, C, and D.

As noted above, firewall boundaries can be implemented using a firewall control block. This firewall control block that can be defined for each Java™ applet and/or Java™ package in accordance with one aspect of the invention. The firewall control can be used to determine whether a Java™ applet should be granted access to another Java™ applet and/or Java™ package.

FIG. 3 illustrates a firewall control block 300 in accordance with one embodiment of the invention. Firewall control block 300 includes a firewall control value 302 and a firewall control indicator 304. The firewall control 302 value provides access privileges definition. The firewall control indicator 304 indicates how the definitions should be interpreted to determine whether one component should access another component.

Figure 3A:
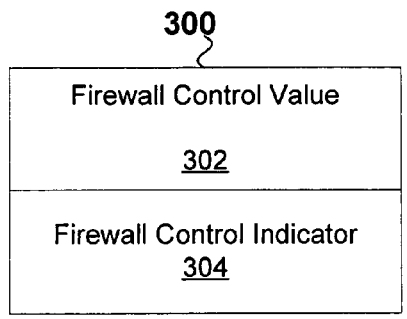
FIGS. 3A-3H illustrate firewall control blocks in accordance with several embodiments of the invention.
Figure 3B:
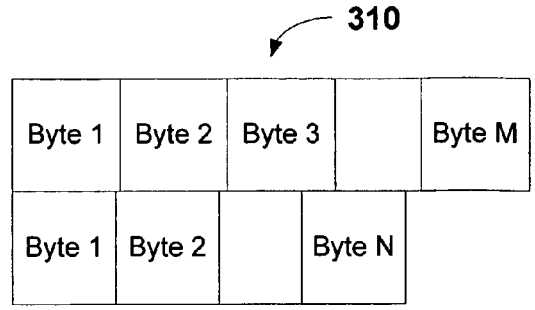

The firewall control value 302 can, for example, be used to define a firewall access value for a Java™ applet. In other words, the control value 302 can define the access privileges for a first Java™ applet and/or package. The firewall control indicator 304 can then be used to determine whether other Java™ applets can access the first Java™ applet and/or Java™ package. As will be appreciated, the firewall control value 302 and 304 can, for example, each be implemented as an array of bytes (i.e., an array of one or more bytes). FIG. 3B illustrates a firewall control block 310 implementation. The firewall control block 310 includes a firewall control value represented as an array of M bytes. An array of N bytes represents the firewall control indicator. It should be noted that N is typically less than M (i.e., typically less bytes are need for the firewall control indicator.

Figure 4:
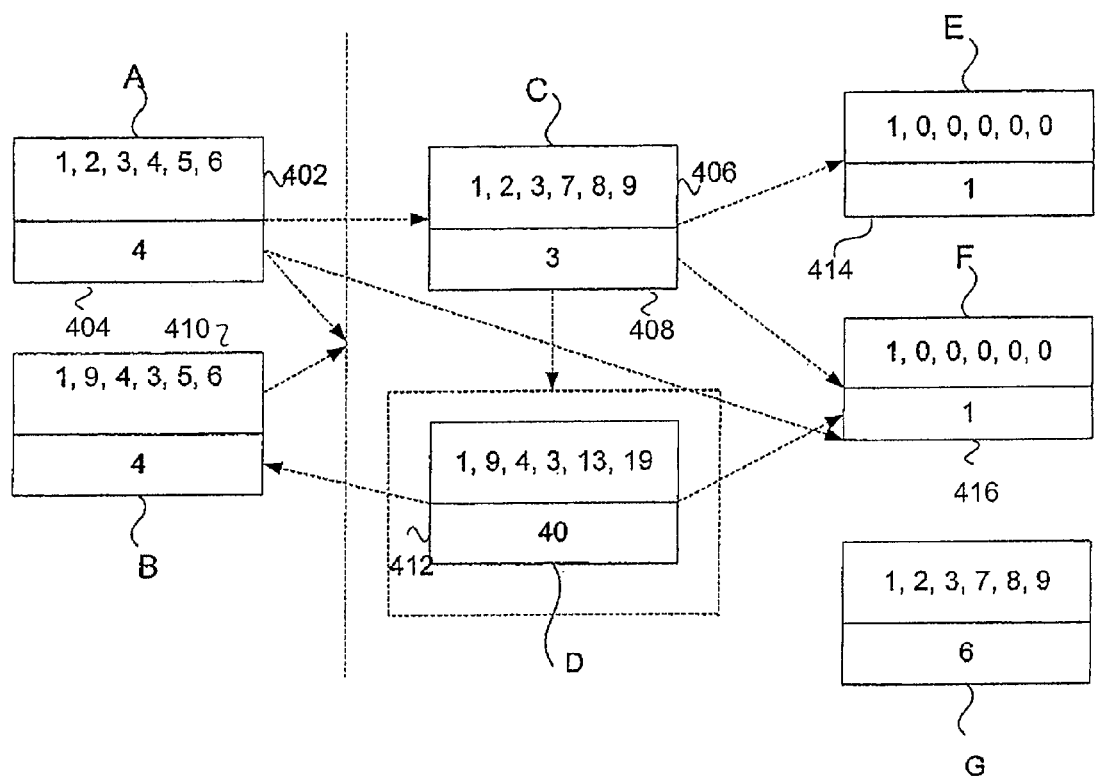
FIG. 4 illustrates simplified firewall control blocks that can be implemented for Java™ applets.

To further illustrate, FIG. 4 illustrates simplified firewall control blocks A, B, C, D, E, F and G that can respectively be implemented for applets A, B, C, D, E, F and G of FIG. 2. As such, firewall control block A can, for example, be used to determine which Java™ applet can be accessed by Java™ applet A. In addition, the firewall control block A can be used to determine whether another applet can access the Java™ applet A. As illustrated in FIG. 4, the firewall control blocks A includes a firewall control value 402 and a firewall control indicator 404. The firewall control value 402 is represented as a series of numerical values (e.g., byte values {1, 2, 3, 4, 5, 6}).

The firewall control value 402 ({1, 2, 3, 4, 5, 6}) can be used to determine whether Java™ applet A can access, for example, Java™ applet C. In order to make this determination, the firewall control indicator 408 of firewall control block C can be used. The firewall control indicator 408 indicates a {3} value. This indicator value can, for example, be interpreted as allowing access to Java™ applets (or packages) that match the first three values of the firewall control value 406 ({1, 2, 3, 7, 8, 9}) of firewall control block C.

This means that the first three values of the firewall control value 402 ({1, 2, 3, 4, 5, 6}) can be compared with the first three values of firewall control value 406 ({1, 2, 3, 7, 8, 9}). It should be noted that the first three values of the firewall control value 402 ({1, 2, 3, 4, 5, 6}) match the first three values of the firewall control value 406 ({1, 2, 3, 7, 8, 9}). Accordingly, applet A can be granted access to applet C.

On the other hand, applet C cannot access applet A because the firewall control indicator 404 ({4}) indicates that the first four values of the firewall control value 406 ({1, 2, 3, 7, 8, 9}) should match the firewall control value 402 ({1, 2, 3, 4, 5, 6}). The fourth value, however, does not match (i.e., 7 is not equal to 4). Accordingly, applet C is denied access to applet A.

Similarly, Java™ applet B is not granted access to Java™ applet C because the second value (or third value) of the firewall control value 410 ({1, 9, 4, 3, 5, 6}) does not match the second value (or third value) of the firewall control value 406 ({1, 2, 3, 7, 8, 9}). The firewall control indicator 412 of the firewall control block D indicates a {40} value. The {40} value can, for example, indicate that no other Java™ applet can access Java™ applet D (e.g., only Java Card™ management system can access Java™ applet D). The Java™ applet D, however, may be able to access other Java™ applets (e.g., Java™ Mapplet B). On the other hand, firewall control indicators 414 and 416 which are respectively provided for Java™ applets E and F can indicate a {1} value that can, for example, be interpreted as allowing access to all Java™ applets which have their first firewall control value equal to the value {1} (e.g., applets A, B, C, D, and G). As such, the applets E and F can, for example, represent a library that can be provided to other selected applets.

Figure 3C:
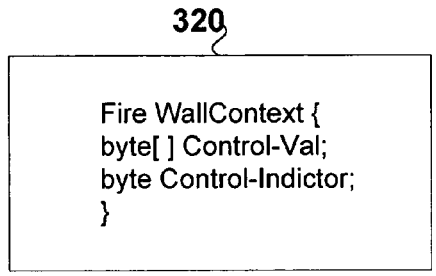

FIG. 3C illustrates a control block 320 in accordance with another embodiment of the invention. As illustrated in FIG. 3C the firewall control value 300 can be implemented as an array of bytes while a single byte is used to implement the firewall control value 302.

Figure 3D:
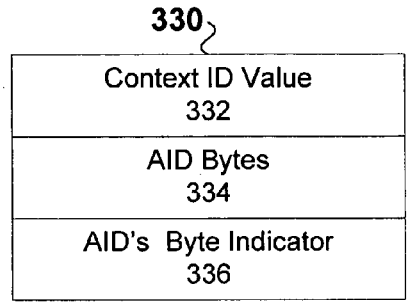

It should also be noted that in accordance with other embodiments of the invention, a firewall control block can be implemented using an additional single byte. This single byte can be added to the data that is typically already available. To illustrate, FIG. 3D depicts a firewall context implementation 330 in accordance with another embodiment of the invention. The firewall context implementation 330 includes the context Identification (ID) 332 and Application Identifier Data (AID), which are typically provided in Java Card™ environments. In addition to these, an AID's byte indicator 336 is provided. The AID's byte indicator 336 can be used in a similar manner as the firewall control indicator (e.g., 404, 408 shown in FIG. 4) while the Application Identifier Data (AID) can be used as the firewall control value (e.g., 402, 406 of FIG. 4).

As will be appreciated, similar to existing Java Card™ environments, the Application Identifier Data (AID) can be defined based on the ISO 7816 standard. ISO 7816 is a multipart standard that describes a broad range of technology for building smart card systems. ISO 7816-5 defines the AID (application identifier) data format to be used for unique identification of card applications (and certain kinds of files in card file systems). The Java Card™ platform uses the AID data format to identify applets and packages. AIDs are administered by the International Standards Organization (ISO), so they can be used as unique identifiers.

Figure 3F:
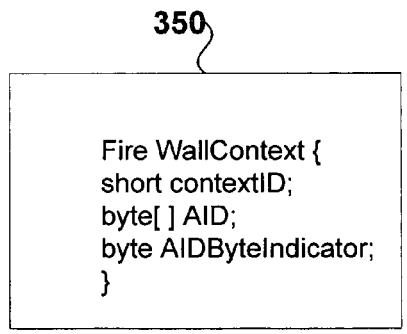
Figure 3E:
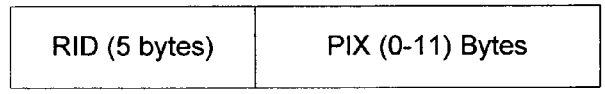

As illustrated in FIG. 3E, the AID format used by the Java Card™ platform can be an array of bytes that is interpreted as two distinct pieces. The first piece is a 5-byte value known as RID (Resource Identifier). The second piece is a variable length value known as a PIX (Proprietary Identifier Extension). A PIX can be from 0 to 11 bytes in length. Thus an AID can be from 5 to 16 bytes in total length. ISO controls the assignment of RIDs to companies, with each company obtaining its own unique RID from the ISO. Companies manage assignment of PIXs for AIDs using their own RIDs. In the Java™ platform, packages are uniquely identified using Unicode strings and a naming scheme based on internet domain names. In the Java Card™ platform, packages and applets can be identified using AIDs. As such, each applet installed on a Java Card™ technology enabled device has a unique AID. This AID is constructed similarly to a package AID. It is typically a concatenation of the applet provider's RID and PIX for that applet.

FIG. 3F illustrates an implementation of the firewall control block 350 in accordance with yet another embodiment of the invention. The firewall control block 350 can, for example, represent an implementation of control block 330 of FIG. 3D. In any case, similar to existing Java Card™ environments, a byte array is used to represent the AID and a short value is used to represent a context ID typically used to represent the context (or object space). As will be appreciated, an AID byte indicator is implemented as a single byte value. As such, control block 350 may be suited for situations where there is no need to minimize the overhead for the firewall implementation. Nevertheless, the AID Byte indicator can be used as a firewall control indicator and the AID can be used as the firewall control value in a similar manner as described above.

Figure 3G:
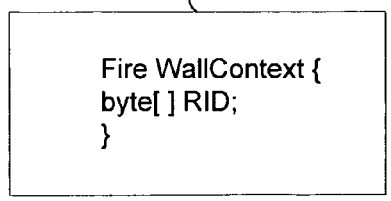

FIG. 3G illustrates a control block 360 in accordance with yet another embodiment of the invention. In the described embodiment, the control block 360 is implemented using a single byte array that represents the RID value. This means that only the RID value is used to determine whether a Java™ applet (or package) can access another Java™ applet (or package). By way of example, if the RID values match then access could be granted. RID values are typically provided in Java Card™ environments. Accordingly, control block 360 can also be implemented without requiring a significant amount of overhead for storing and processing firewall control block information. Similar to the RID value, the AID value can be used to implement a firewall control block.

Based on the foregoing, it should be clear that the invention contemplates many different firewall control block embodiments. One or more of these embodiments may be suited for a particular system requirement (e.g., memory storage, speed, etc.) For example, control block 360 of FIG. 3G may be suited to environments where memory and overhead designated to the firewall should be minimized.

Figure 3H:
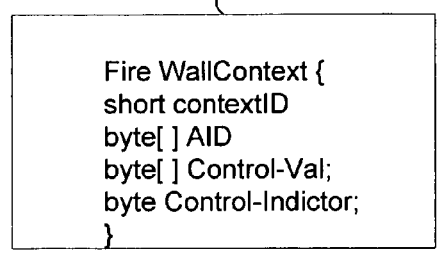

It should also be noted that various embodiments may be combined. By way of example, FIG. 3H illustrates a control block 370 in accordance with still another embodiment of the invention. The control block 370 can, for example, represent a combination of control blocks 320 and 350. In the described embodiment, AID, firewall control value, and firewall control indicator are provided. As will be illustrated below, the control block 370 provides the flexibility to use various techniques for implementing configurable firewalls in Java™ card environments. In addition, control block 370 may serve as a useful tool to illustrate some of these techniques.

Figure 5:
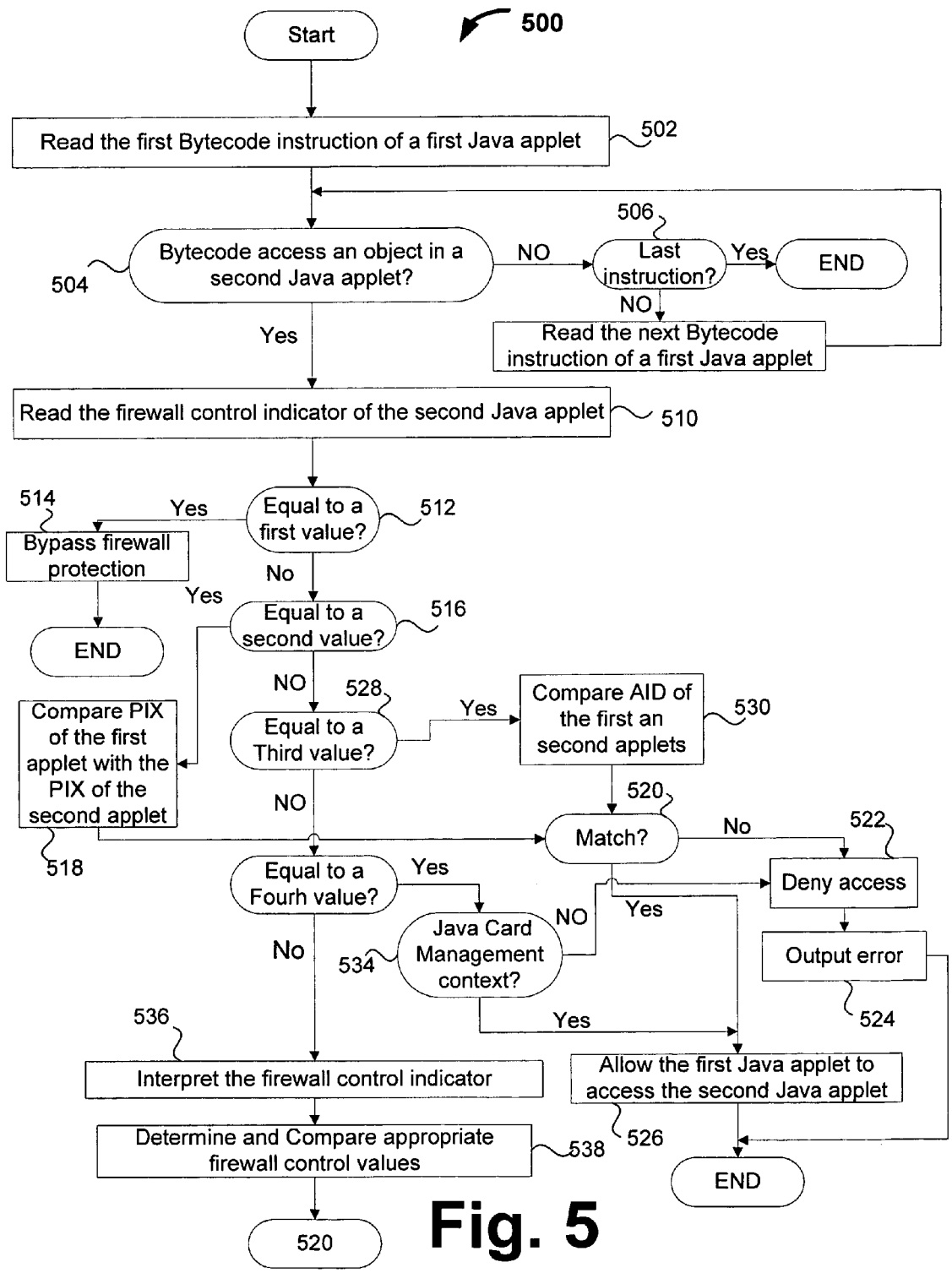
FIG. 5 illustrates a method for providing a firewall in Java™ card environment in accordance with one embodiment of the invention.

Accordingly, FIG. 5 illustrates a method 500 for providing a firewall in Java™ card environment in accordance with one embodiment of the invention. The method 500 can, for example, be used in conjunction with the control block 370 of FIG. 3H where AID, firewall control value, and firewall control indicator are all provided. Initially, at operation 502, the first bytecode instruction of a first Java™ applet is read. Next, at operation 504, a determination is made as to whether the bytecode of the first Java™ applet is attempting to access an object in another (or a second) Java™ applet. If it is determined at operation 504 that the bytecode of the first Java™ applet is not attempting to access an object in a second Java™ applet, the method 500 proceeds to operation 506 where it is determined whether the last bytecode instruction has been reached. If that is the case, the method 500 ends. However, if it is determined at operation 506 that the last bytecode instruction has not been reached, the method 500 proceeds to operation 508 where the next bytecode instruction of the first Java™ applet is read. Thereafter, the method 500 proceeds to operation 504 where it is determined whether the bytecode of the first Java™ applet is attempting to access an object in a second Java™ applet.

If it is determined at operation 504 that the bytecode of the first Java™ applet is attempting to access an object in a second Java™ applet, the method 500 proceeds to operation 510 where the firewall control indicator of the second Java™ applet is read. Accordingly, at operation 512, a determination is made as to whether the firewall control indicator of the second Java™ applet is equal to a first value (e.g., 0.times.80). If it is determined at operation 512 that the firewall control indicator of the second Java™ applet is equal to the first value, the method 500 proceeds to operation 514 where the control block firewall protection can be bypassed (e.g., firewall protection can be provided based on package boundaries). The method 500 ends following operation 514. However, if it is determined at operation 512 that the firewall control indicator of the second Java™ applet is not equal to a first value, the method 500 proceeds to operation 516, where it is determined whether the firewall control indicator of the second Java™ applet is equal to a second value. The second value can indicate that PIX values (see, for example, FIG. 3E) of the first and second Java™ applets should be compared for a match. Accordingly, if the firewall control indicator of the second Java™ applet is equal to the second value, at operation 518, the PIX values of the first and second applets can be compared. Thereafter, the method 500 proceeds to operation 520 where it is determined whether these values match. If these values don't match, the method 500 proceeds to operation 522 where access is denied. In addition, an error can be output at operation 524 (e.g., a "Java.lang.SecurityException" can be thrown). The method 500 ends following operation 524.

On the other hand, if it is determined at operation 520 that there is a match, the method 500 proceeds to operation 526 where the first Java™ applet is granted access to the second Java™ applet. As will be appreciated, this access can be provided without requiring a sharable interface to be implemented. In one embodiment, a reference to the second applet is provided by a method that can be invoked. This method, can for example, be a relatively simple get-reference method implemented as a part of the Java™ card management (or system) environment (e.g., getAppletReference( ) method). As will be appreciated by those skilled in the art, a partner method can also be provided for this get-reference method. This partner method can, for example, be a method implemented as a Java™ applet class.

Referring back to FIG. 5, if it is determined at operation 516 that the firewall control indicator of the second Java™ applet is not equal to the second value, the method 500 proceeds to operation 528 where it is determined whether the firewall control indicator of the second Java™ applet is equal to the third value. If that's the case, the method 500 proceeds to operation 530 where the AID (see, for example, FIG. 3E) values of the first and second applets are compared. Thereafter, the method 500 proceeds to operation 520 in a similar manner as described above.

However, if it determined at operation 528 that the firewall control indicator of the second Java™ applet is not equal to the third value, the method 500 proceeds to operation 532 where it is determined whether it is equal to a fourth value. The fourth value can indicate that access is reserved only for the Java Card™ management. Accordingly, if the firewall control indicator of the second Java™ applet is equal to the fourth value, the method 500 proceeds to operation 534 where it is determined whether the bytecode is being executed under the Java Card™ management context (e.g., whether the context ID is that of the Java Card™ management). Depending on this determination, the method 500 can proceed either to operation 522 where access is denied or operation 526 where access is granted, in a similar manner as described above.

Finally, if it determined at operation 532 that the firewall control indicator of the second Java™ applet is not equal to the fourth value, the method 500 proceeds to operation 536 where the firewall control indicator is interpreted. By way of example, the firewall control indicator can be interpreted in a similar manner as illustrated in FIG. 4, where one or more bytes of the firewall control values respectively assigned to the first and second applets are compared based on the value of the firewall control indicator. In any case, based on the interpretation, at operation 538, the appropriate control values can be determined and compared for a match. Accordingly, the method 500 proceeds to operation 520 where it is determined whether there is match between the values. The method 500 proceeds in a similar manner as described above where access can be granted at operation 526 or denied at operation 522. The method 500 ends following either operation 524 where an error is output or the first Java™ applet is allowed accessed to the second Java™ applet at operation 526.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A computing environment, comprising:
an operating system;
a virtual machine operating on said operating system;
a first application operating on said virtual machine;
a second application operating on said virtual machine;
a first firewall control block, wherein said first firewall control block defines access privileges of said first application with respect to said second application, and further defines the access privileges of said second application with respect to said first application; and
a second firewall control block, wherein said second firewall control block defines access privileges of said second application with respect to said first application, and further defines the access privileges of said first application with respect to said second application,
wherein said first firewall control block and the second firewall control block each includes a firewall control value and a firewall control indicator, the firewall control value including an application identifier data having a resource identifier and a proprietary identifier extension, the firewall control indicator being an indicator value represented by one or more bytes that indicate how the firewall control value should be interpreted with respect to access privileges of other applications, and
wherein when said firewall control indicator of said first firewall control block has a first indicator value, said first firewall control block compares said proprietary identifier extension of said first firewall control block to said proprietary identifier extension of said second firewall control block, and when said firewall control indicator of said first firewall control block has a second indicator value, said first firewall control block compares said proprietary identifier extension and resource identifier of said first firewall control block to said proprietary identifier extension and resource identifier of said second firewall control block.

2. A computing environment as recited in claim 1, wherein said first firewall control block defines access privileges of said first application with respect to any other application in said computing environment, and further defines the access privileges of said any other application with respect to said first application.

3. A computing environment as recited in claim 1, wherein said computing environment is a Java compliant computing environment, and wherein said first and second applications are Java compliant applets.

4. A computing environment as recited in claim 1, wherein said computing environment is a Java compliant computing environment, and wherein said first firewall control block is implemented as in the run time environment.

5. A mobile computing device, comprising:
an operating system; a Java compliant virtual machine operating on said operating system;
a first Java compliant applet operating on said Java compliant virtual machine;
a Java compliant applet operating on said virtual machine Java compliant virtual machine; and
a first firewall control block, wherein said first firewall control block defines access privileges of said first Java compliant applet with respect to at least one other Java compliant applet operating on said Java compliant virtual machine, and further defines the access privileges of said at least one other Java compliant applet with respect to said first Java compliant applet; and
a second firewall control block, wherein said second firewall control block defines access privileges of said at least one other Java compliant applet with respect to the first Java compliant virtual machine, and further defines the access privileges of said first Java compliant applet with respect to said at least one other Java compliant applet,
wherein said first firewall control block and said second firewall control block each includes a firewall control value and a firewall control indicator, the firewall control value including an application identifier data having a resource identifier and a proprietary identifier extension, the firewall control indicator being an indicator value represented by one or more bytes that indicate how the firewall control value should be interpreted with respect to access privileges of other Java compliant applets, and wherein when said firewall control indicator of said first firewall control block has a first indicator value, said first firewall control block compares said proprietary identifier extension of said first firewall control block to said proprietary identifier extension of said second firewall control block, and when said firewall control indicator has a second indicator value, said first firewall control block compares said proprietary identifier extension and resource identifier of said first firewall control block to said proprietary identifier extension and resource identifier of said second firewall control block.

6. A mobile computing device as recited in claim 5, wherein said mobile device is a Java compliant smart card.

7. A mobile computing device as recited in claim 6, wherein for a firewall control block is defined by for every Java compliant applet.

8. A method of providing security for a Java compliant computing environment that includes a Java virtual machine and a plurality of Java compliant applets that operate on said Java virtual machine, said method comprising:

receiving a request from a first Java compliant applet operating on a Java virtual machine to access a second Java compliant applet, the first Java compliant applet having a first firewall control block associated with it and the second Java compliant applet having a second firewall control block associated with it;

reading the second firewall control block associated with said second Java compliant applet, said first firewall control block and said second firewall control block each including a firewall control value and a firewall control indicator, the firewall control value including an application identifier data having a resource identifier and a proprietary identifier extension, the firewall control indicator being an indicator value represented by one or more bytes that indicate how the firewall control value should be interpreted with respect to access privileges of the respective first or second Java compliant applet;

determining, based on said second firewall control block, whether said first Java compliant applet should be allowed to access said second Java compliant applet by determining whether said firewall control value of said second firewall control block has a first indicator value or a second indicator value, wherein wherein said first firewall control block and said second firewall control block has a first indicator value, said second firewall control block compares said proprietary identifier extension of said first firewall control block to said proprietary identifier extension of said second firewall control block, and wherein said firewall control indicator of said second firewall control block has a second indicator value, said second firewall control block compares said proprietary identifier extension and resource identifier of said first firewall control block to said first firewall control block to said proprietary identifier extension and resource identifier of said second firewall control block; and allowing said first Java compliant applet to access said second Java compliant applet when said determining determines that access should be allowed.

9. A method as recited in claim 8, wherein said method further comprises:

Providing a reference to said first Java compliant applet with a reference to said second Java compliant applet when said determining determines that access should be allowed.

10. A method as recited in claim 8, wherein said providing of a reference comprises:

Invoking a first method that is implemented as a part of Java management environment or Java system environment; and Invoking a second method that is implemented as a Applet class, as a result of said invoking of the second method.

11. A computer readable media including computer program code for providing security for a computing environment, said computer readable media comprising:

computer program code for receiving a request from a first application to access a second application, the first application having a first firewall control block associated with it and the second application having a second firewall control block associated with it;

computer program code for reading the second firewall control block associated with said second application, said first firewall control block and said second firewall control block each including a firewall control value and a firewall control indicator, the firewall control value including an application identifier data having a resource identifier and a proprietary identifier extension, the firewall control indicator being an indicator value represented by one or more bytes that indicate how the firewall control value should be interpreted with respect to access privileges of the respective first or second application;

determining, based on said second firewall control block, whether said first application should be allowed to access said second application by determining whether said firewall control value of said second firewall control block has a first indicator value or a second indicator value, wherein when said firewall control indicator of said second firewall control block has a first indicator value, said second firewall control block compares said proprietary identifier extension of said first firewall control block to said proprietary identifier extension of said second firewall control block, and when said firewall control indicator of said second firewall control block has a second indicator value, said second firewall control block compares said proprietary identifier extension and resource identifier of said first firewall control block to said proprietary identifier extension and resource identifier of said second firewall control block; and allowing said first application to access said second application when said determining determines that access should be allowed.

* * * * *